United States Patent [19]

Anderson

[11] Patent Number: 4,603,478
[45] Date of Patent: Aug. 5, 1986

[54] TRIMMER WITH ADJUSTABLE HANDLE

[75] Inventor: Kenneth K. Anderson, Moorpark, Calif.

[73] Assignee: Allegretti & Company, Chatsworth, Calif.

[21] Appl. No.: 639,816

[22] Filed: Aug. 13, 1984

[51] Int. Cl.$^4$ ............................................. A01D 55/18
[52] U.S. Cl. .................................. 30/276; 16/111 R; 16/334; 30/347
[58] Field of Search ............... 30/276, 347; 16/111 R, 16/111 A, 112, 332, 334, 344; 403/92-97; 280/47.37; 180/19.1; 56/DIG. 18; 74/543

[56] References Cited

U.S. PATENT DOCUMENTS

| D. 194,430 | 1/1963 | Lamb | 30/276 X |
|---|---|---|---|
| 1,261,859 | 4/1918 | Seiter | 403/93 X |
| 2,263,431 | 11/1941 | White | 30/276 X |
| 2,966,365 | 12/1960 | Kortm | 280/47.37 R |
| 4,020,552 | 5/1977 | Mizuno et al. | 30/276 |
| 4,077,191 | 3/1978 | Pittinger | 30/276 X |
| 4,211,004 | 7/1980 | Woods | 30/276 |
| 4,250,623 | 2/1981 | Pittinger | 30/347 |
| 4,392,538 | 7/1983 | Goatzen | 16/111 A |

FOREIGN PATENT DOCUMENTS 11280 of 1900 United Kingdom ................. 403/93

Primary Examiner—James M. Meister
Attorney, Agent, or Firm—Lyon & Lyon

[57] ABSTRACT

A trimmer having a pivotally adjustable handle tube for selectively changing the cutting angle of a trimming cord with respect to the handle tube, thereby permitting the trimming of grass, brush, weeds and the like from underneath normally inaccessible or difficult to access areas. The trimmer comprises an elongated handle tube having a handle at an upper end for grasping by an operator and pivotally mounted at a lower end to a motor housing for carrying a motor which rapidly rotates a trimming cord. The handle tube and motor housing support at least one locking pin for releasable engagement between selected teeth of a rack to releasably fix the angular position of the handle tube relative to the motor housing.

28 Claims, 6 Drawing Figures

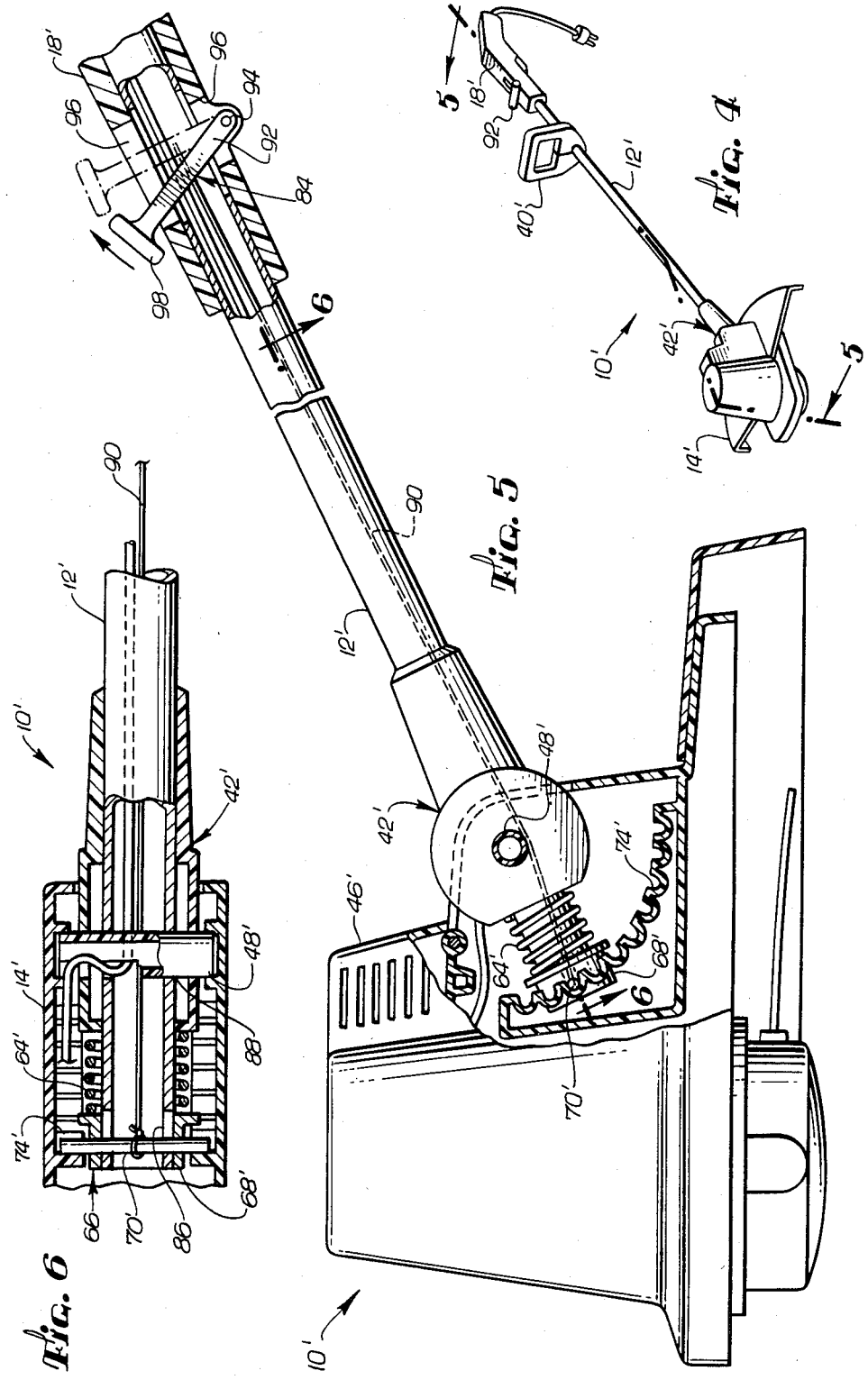

TRIMMER WITH ADJUSTABLE HANDLE

BACKGROUND OF THE INVENTION

This invention relates to the field of trimmers utilizing rotatable flexible trimming cords of nylon or the like, and more particularly, to a hand-held trimmer having a pivotally adjustable handle tube for selectively changing the cutting angle of the trimming cord with respect to the handle tube.

Hand-held trimmers utilizing rotatable trimming cords for use in cutting grass, brush, weeds and the like have been in public use for many years. Such trimmers generally comprise an elongated handle tube carrying a handle at an upper end for grasping by the operator and an electric or gas powered motor at an opposite lower end for rapidly rotating the trimming cord. The motor usually is enclosed within a protective housing connected to the handle tube for keeping the motor clean and partially shielding the trimming cord to prevent possible injury to the operator and others. In use, the operator typically holds the handle at approximately waist height and directs the rotating trimming cord appropriately to trim and cut the particular vegetation.

In available trimmers of the general type described, however, the handle tube typically is rigidly connected to the motor housing, thereby determining a fixed angular relationship between the motor housing and the handle tube. Consequently, the cutting angle of the trimming cord rotated by the motor also has a fixed relationship with respect to the handle tube. Thus, in order to maintain a typically desired parallel cutting relationship between the trimming cord and the matter to be trimmed, such as grass growing on relatively flat ground, the operator constantly and invariably must keep the handle and the handle tube in the same angular position with respect to the ground. This fixed relationship between the trimming cord and the handle tube may make trimming difficult for persons of other than about average height. Moreover, this fixed angular relationship can render use of the trimmer impractical or impossible in certain types of terrain.

More particularly, by way of example, it is frequently desirable to trim grass or other vegetation growing underneath a table, bush, or similar object overhanging a relatively large terrain surface area. In such instances, especially when the table or object is relatively close to the ground, the motor housing and trimming cord may not be able to access the entire terrain area due to the handle tube being obstructed, for example, by the outer edges of the table or the like.

To attempt to trim underneath objects such as tables and the like, the operator must lower the handle tube and further extend the motor and trimming cord underneath the object. However, lowering of the handle tube in this manner is undesirable because it moves the trimming cord to an unparallel cutting relationship with respect to the ground and thereby results in uneven trimming. Additionally, and perhaps more importantly, lowering of the handle tube progressively exposes the bottom of the motor housing and the trimming cord, thereby increasing the risk of injury.

Accordingly, there has existed a definite need for a reliable and economical nylon cord trimmer having a pivotally adjustable handle tube for selectively and easily changing the cutting angle of the cord with respect to the handle tube. The present invention satifies this need and provides further related advantages.

SUMMARY OF THE INVENTION

The present invention provides a hand-held nylon cord trimmer having a handle tube that is pivotally adjustable at its connection to a motor housing for selectively changing the cutting angle of a nylon trimming cord with respect to the handle tube. A lower end of the handle tube extends into the motor housing for selective releasable engagement of at least one locking pin between teeth of a curved rack to permit selective angular adjustment of the handle tube position. In the preferred forms, the handle tube is adjustable through about a 90 degree angle such that the handle tube may be moved between positions that are substantially parallel or substantially perpendicular to the cutting plane of the trimming cord, or any selected number of angular positions therebetween. Moreover, the adjustable handle trimmer of the present invention is simple to use, reliable in operation, relatively inexpensive to manufacture and does not require any significant maintenance.

The trimmer of this invention comprises, in one preferred form, a handle tube connected at an upper end to a handle for grasping by the operator and connected at an opposite lower end to a protective motor housing. A motor is enclosed within the motor housing and rotates a relatively thin trimming cord of nylon or the like at a sufficient angular velocity for cutting grass, weeds, brush and the like. Generally, the handle tube is an elongated hollow tube constructed from lightweight materials and is slidably received within a mounting collar pivotally mounted onto the housing by a transverse collar bolt formed on the collar. The bolt passes through longitudinally elongated slots in the handle tube whereby the collar is limited to rotation about the bolt and the axially elongated slots in the handle tube permit rotation of the handle tube with the bolt as well as limited longitudinal or axial handle tube movement with respect to the bolt and the collar. Accordingly, the handle tube is permitted to slidably move a short distance in and out of the motor housing.

The lower end of the handle tube extends past the mounting collar into the motor housing and carries a pair of the locking pins disposed generally in parallel with the collar bolt to extend tranversely outwardly for selective engagement between teeth on a pair of curved racks on the motor housing. A spring coaxially placed over the handle tube reacts between the mounting collar and the handle tube to urge against the handle tube to slidably move through the collar to a position within the housing with the locking pins in engagement with the rack teeth.

The racks comprise two parallel curved sections connected to the housing and having teeth or slots in one preferred form at approximately every 10 degrees of curvature and transversely aligned with teeth on the other rack, with the racks being spaced apart on opposite sides of the handle tube for engaging the locking pins. As the handle tube pivots with the mounting collar, the locking pins pass between the two racks, whose curvature matches the arc of rotation of the pins. To move the pins from one set of teeth to the next, the operator manually grasps the handle tube and slidably pulls it outwardly relative to the collar within the limits of the longitudinal slots in the handle tube, thus compressing the spring between the collar and the handle tube. The operator may then pivot the handle tube and mounting collar about the motor housing, and when a desired position is reached, release the handle tube. The force of the compressed spring will return the pins to engagement with a respective pair of teeth in the racks, thereby securing the handle tube in an alternative angular position of adjustment.

In a second embodiment of the invention, the locking pins are slidably fitted over the lower end of the handle tube, with the mounting collar pivotally supporting the handle tube without longitudinal displacement relative to the motor housing. As in the first embodiment, the locking pins are releaseably engageable between teeth of arcuate racks on the motor housing to secure the handle tube at a selected angular position.

The pins are moved in and out of engagement with the rack teeth by a cable connected between the pins and a lever preferably positioned on the handle tube adjacent to or on the handle, which is grasped by the operator. In this embodiment, movement of the lever in a first direction pulls the pins from the rack teeth and compresses a spring, whereupon the handle tube and mounting collar may then be pivoted about the housing to a desired alternate position. After this, the lever may be released for spring-loaded return in a second direction to its initial position, to urge the pins into normal engagement with the rack teeth.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is an isometric view of a hand-held cord trimmer having a pivotally adjustable handle tube embodying the novel features of the invention;

FIG. 2 is an enlarged cross-sectional view of the trimmer, taken substantially along line 2—2 of FIG. 1, showing a spring-loaded pin assembly at one end of the handle tube for engagement with a curved rack of teeth;

FIG. 3 is a fragmentary cross-sectional view of the components of the pivotally adjustable handle tube taken substantially along 3—3 of FIG. 2;

FIG. 4 is an isometric view substantially similar to that of FIG. 1, showing a second embodiment of a hand-held cord trimmer embodying the novel features of the invention;

FIG. 5 is an enlarged, fragmentary cross-sectional view of the trimmer, taken substantially along line 5—5 of FIG. 4, showing a cable connected between a modified spring-loaded pin assembly and a control lever for moving the pin assembly in and out of engagement with a curved rack of teeth; and FIG. 6 is a fragementary cross-sectional view of the components of the pivotally adjustable handle tube taken substantially along line 6—6 of FIG. 5.

DETAILED DESCRIPTION OF THE PREFERRED EMBODIMENTS

As shown in the accompanying drawings, the present invention is embodied in a hand-held trimmer, indicated generally by the reference numeral 10, for use in trimming grass, brush, weeds and the like from a variety of terrain. The trimmer 10 has an adjustable handle tube 12 pivotally mounted to a motor housing 14 for selectively changing the angular relationship of the handle tube 12 with respect to the motor housing 14, and thus also with respect to a flexible trimming cord 32.

The device of this invention is particularly useful in trimming grass and other vegetation from underneath objects having relatively large planar surfaces supported above the ground, such as tables and other similar objects. More particularly, trimming underneath such objects with a typical hand-held trimmer may be difficult or impossible because the handle tube may be obstructed by the edges of the object, especially if the object is relatively close to the ground, thereby preventing the motor housing from extending completely underneath the center of the object at a desired cutting orientation. Although it may be possible to extend the housing completely underneath the object by lowering the handle tube towards the ground, this causes a trimming cord rotated by a motor enclosed within the housing to assume an unparallel cutting relationship to the ground or other cutting surface. This unparallel cutting relationship causes the grass to be unevenly trimmed, which is unsightly, and the exposed trimming cord creates a potential safety hazard. In such instances, the utility of the hand-held trimmer is thus substantially and undesirably limited.

In accordance with the present invention, the pivotally adjustable handle tube 12 allows the angular relationship between the handle tube 12 and the motor housing 14 to be varied, as desired, to trim normally inaccessible or hard to access areas underneath tables or the like and still maintain a parallel cutting relationship between the trimming cord and the ground. As described more fully herein, the adjustable handle tube 12 may be manually pivoted about the housing 14 preferably through an approximately 90 degree angle of rotation to provide a variety of angular orientations of the handle tube 12 with respect to the motor housing 14, thus preventing obstruction of the handle tube 12 by the edges of objects under which grass or other matter is to be trimmed.

FIG. 1 shows an isometric view of the trimmer 10, with the handle tube 12 having at an upper end 16 a handle 18 for grasping by the operator, and the motor housing 14 at an opposite lower end 20 for enclosing and protecting a motor 22 (FIG. 2). A downwardly facing trimmer head 24 is disposed beneath a bottom wall 26 of the housing 14 and is mounted for rotation on a drive shaft 28 coupled to the motor 22, such that when the motor 22 is connected to a source of electrical power by a harness 30, the trimmer head 24 rotates the trimming cord 32 at an angular velocity sufficient to trim grass, weeds, brush and the like. The cord 32 preferably is made from nylon, but another suitable cutting means may be used as desired.

As is conventional in the art, the motor 22 in the preferred embodiment is an electrically powered unit, however, it is understood that a motor of a different type, such as gas powered, may be used so long the cord is rotated at the requisite velocity. Additionally, several air vents 33 are provided in the housing to permit adequate air circulation for cooling of the motor 22. The source of electrical power may be provided to the motor 22 by any conventional electrical source adapted for receiving a plug 34 connected to the end of the handle 18 by a cord 36 suitably linked to the harness 30. It is contemplated that an extension cord (not shown) will be used to give the trimmer 10 a wide trimming range, and therefore, the cord 36 in the preferred embodiments is relatively short for purposes of convenience and ease of storage of the trimmer 10.

Electrical power may be connected and disconnected to the motor 22, after the plug 34 is coupled to the suitable electrical source, by a trigger 38 located on the underside of the handle 18. The trigger 38 may be of the type commonly used to connect and disconnect power through switch means or the like, and accordingly, it will not be explained in further detail. Connected to the handle tube 12 on the inboard side of the handle 18 is a hand grip 40 for grasping by the operator to facilitate manuevering of the motor housing 14 by the operator and trimming of the terrain in question.

In accordance with the invention, the handle tube 12 is pivotally mounted to the motor housing 14 for rotation through an approximate 90 degree range of movement. More specifically, a collar 42 is pinned for rotation in an opening 44 on an upwardly facing outside surface 46 of the housing 14 by a transverse mounting bolt 48 and is adapted for slidably receiving the handle tube 12. The collar 42 preferably comprises a pair of separate collar halves 49, which when joined together by a transverse retainer screw 50, form the bolt 48 and a substantially circular disk-shaped body 51 having a short cylindrical extension 52 protruding radially outwardly therefrom. Alternatively, the collar 42 and bolt 48 may be separately formed pieces.

When the collar halves 49 are joined, a bore or cylindrical void 54 is provided in the collar 42 for slidably receiving the handle tube 12. The bore 54 passes diametrically through the disk-shaped body 51 and axially through the cylindrical extension 52. For reasons of economy and weight considerations, the collar 42 preferably comprises a hollow formed shell, with circular guide holes corresponding to the bore 54 appropriately located in the body 51 and extension 52 for receiving the handle tube 12. To ensure a stable connection between the handle tube 12 and the housing 14, which is necessary for convenient maneuvering of the housing 14, the diameter of the bore 54 is only slightly greater than the outside diameter of the handle tube 12 thereby to permit free axial movement of the handle tube 12 within the bore 54 yet substantially prevent radial movement therein. As explained below, axial movement of the handle tube 12 with respect to the housing 14 is limited to enable pivotal adjustment of the handle tube 12.

The transverse mounting bolt 48 is formed when the two separate collar halves 49 are joined together by the retainer screw 50. More specifically, a hollow stubshaft 56 is integrally formed in each collar half 49 and projects outwardly from and inwardly toward the center of the disk shaped body 51. When the collar halves 49 are joined, the outboard ends of the stubshafts 56 are received by a pair of oppositely facing seats 58 formed in the housing 14, and the inboard ends of the stubshafts 45 meet to form the completed collar bolt 48.

The bolt 48 passes through the handle tube 12 through a pair of oppositely facing slots 60 in the handle tube 12 which are elongated in an axial or longitudinal direction. Similarly, the retainer screw 50 also passes through a pair of oppositely facing axially elongated slots 61 in the handle tube 12. These axially elongated slot configurations of the handle tube 12 permit rotational or pivotal movement of the handle tube 12 and the collar 42 with respect to the housing 14 as well as limited axial movement of the handle tube 12 with respect to the collar 42, thus allowing the handle tube 12 to be moved a predetermined distance in and out of the collar 42 and motor housing 14.

The axially elongated slots 60 and 61 in the handle tube are located inwardly a short distance from the lower end 20 of the handle tube 12 to permit a lower end portion 62 of the handle tube 12 to extend within the housing 14. At this lower portion 62, a spring 64 is coaxially positioned over the handle tube 12 for abutting engagement with the outboard or lower end of the collar 42. The spring 64 is retained on the handle tube 12 by confinement between the outboard end of the collar 42 at one end of the spring 64 and a locking pin assembly 66 coupled to the outermost end of the handle tube 12 at the other end.

The locking pin assembly 66 comprises a ring 68 coaxially placed over the lower end 20 of the handle tube 12 and retained thereon by a locking pin 70 inserted through oppositely facing holes 72 in the ring 68 and handle tube 12. The inboard end of the ring 68 is radially outwardly flanged to provide a larger annular surface on the ring 68 to enable a secure abutting engagement with the spring 64 and prevent the spring 64 from inadvertently sliding over the ring 68. Since the collar 42 is pivoted to the housing 14 by the bolt 48 and has only rotational movement, the spring 64 tends normally to urge against the flanged ring 68 and force the handle tube 12 to slidably move through the collar 42, thereby urging the assembly 66 into the housing 14. This normal position is illustrated best in FIG. 2, wherein it will be noted that the axial movement of the handle tube 12 within the housing 14 and the collar 42 is limited by the mounting bolt 48, which contacts the ends of the axially elongated slots 60 and prevents further axial movement into the housing 14 from the force of the spring 64.

The angular adjustment of the handle tube 12 with respect to the housing 14 is achieved by pivoting the handle tube 12 with respect to the housing 14 and causing the opposite ends of the pin 70 to selectively engage sets of teeth 74 formed respectively on a pair of curved racks 76 within the housing 14. As shown best in FIGS. 2 and 3, the racks 76 are spaced apart on opposite sides of the pin assembly 66 and are curved through approximately a quarter circle, with the bolt 48 corresponding to the center of curvature represented by the racks 76. Thus, it will be appreciated that pivoting of the handle tube 12 causes angular movement of the pin assembly 66 to move the pin 70 through a curvature which generally corresponds to the curvature of the racks 76.

The racks 76 preferably are integrally formed with the housing 14 and are supported therein by the bottom wall 26 and a partition 78 located substantially in the middle of the housing 14. The racks 76, as well as the housing 14, handle 18, hand grip 40, collar 42, ring 68 and pin 70 may be constructed from hard plastic or another lightweight material suitable for use in injection molding processes or the like for making these components of the trimmer 10. On the other hand, the handle tube 12 and spring 64 normally are constructed from steel, aluminum or other appropriate metallic alloy preferably having lightweight properties.

To permit periodic servicing of the motor 22 and general cleaning of the housing 14, the housing 14, like the collar 42, may be partially disassembled into two meridional sections substantially, for example, along the line 2—2 of FIG. 1, with one rack 76 formed in each section or side of the housing 14. It also will be noted that the racks 76 have a ribbed or webbed construction on their backside surface opposite the teeth 74. This ribbed construction reduces the overall weight of the housing 14 to enable more convenient maneuvering of the housing 14 and provide prolonged periods of trimming without tiring the operator. Alternatively, the racks 76 may be of a solid based construction contiguous with the bottom wall 26 and partition 78, although this disadvantageously will increase the weight of the housing 14.

To allow for the passage of the harness 30 from the housing 14 and through the handle tube 12 to the trigger 38, an entrance hole 79 and an exit hole 80 are provided in the bolt 48. More specifically, the entrance hole 79 is positioned in one of the hollow stubshafts 56, with the exit hole 80 comprising two matching semi-circular cut-outs formed on the inboard mating ends of the stubshafts 56. The entrance hole 79 and exit hole 80 guide the harness 30 through the handle tube 12 and prevent the harness 30 from being entangled within the locking pin assembly 66 and teeth 74.

The teeth 74 are integrally formed on the racks 76 at locations approximately every 10 degrees and are sized to receive radially protruding ends 81 of the locking pin 70, which secures the flanged ring 68 to the handle tube 12. Thus, the pin assembly 66, which is rigidly attached to the handle tube 12, may be moved in and out of engagement with the teeth 74 by axial movement of the handle tube 12.

To facilitate manual grasping and retraction of the handle tube 12 from the collar 42 and housing 14, a sleeve 82 for grasping by the operator is provided between the hand grip 40 and the collar 42. The sleeve 82 preferably is constructed from natural or synthetic rubber, or another suitable gripping material. To adjust the angular position of the handle tube 12 with respect to the housing 14, the operator may grasp the sleeve 82 and pull the handle tube 12 axially through the collar 42 and away from the housing 14. This will disengage the ends 81 of the pin 70 from the rack teeth 74 and allow free rotation of the handle tube 12 about the transverse bolt 48. When a desired angular position of the handle tube 12 is reached, the operator may release his or her grip on the sleeve 82 and allow the spring 64 to urge the handle tube 12 to a normal position with the pin 70 in engagement with the teeth 74. If the pin 70 inadvertently rests on a land 84 separating the teeth 74 and does not align properly with the teeth 74, the spring force usually will urge the pin 70 into alignment with the nearest set of teeth 74. If it does not, minor angular movement of the handle tube 12 by the operator should correct any misalignment problems by moving the pin 70 for spring-loaded engagement with the nearest set of teeth 74.

From the foregoing, it will be appreciated that axial retraction and pivoting of the handle tube 12 permits quick and easy angular adjustment of the handle tube 12 with respect to the housing 14. Each time the handle tube 12 is pulled from the housing 14, the pin 70 is disengaged from the teeth 74 to permit angular rotation of the handle tube 12. Upon releasing the handle tube 12, the spring 64 returns the pin 70 into normal engagement with the nearest set of teeth 74.

In a second preferred embodiment of the invention, shown in FIGS. 4-6, the pin assembly 66' is slidably mounted on the handle tube 12' for engagement and disengagement with the teeth 74'. More specifically, the handle tube 12' is provided near its lowermost end with a pair of oppositely facing slits 86 elongated in an axial or longitudinal direction for slidably receiving the locking pin 70'. The locking pin 70' is rigidly connected to a flanged ring 68', which is slidably mounted over the handle tube to permit the pin assembly 66' to axially slide a limited distance within the slits 86 and along the handle tube 12'. Axial movement of the handle tube 12' with respect to the housing 14' and the collar 42', however, is restrained by the transverse mounting bolt 48', which is inserted through a transverse hole 88 in the handle tube 12', there being no axially elongated slots for the bolt 40' to permit limited axial movement. The collar 42' and bolt 48' are separately formed pieces but, alternatively, may integrally molded halves, like the collar 49 in the first embodiment.

Sliding movement of the pin assembly 66' for engagement and disengagement with the teeth 74' is provided by a lever and cable assembly 89. The lever and cable assembly 89 comprises a cable 90 located within the handle tube 12' and connected at one end to the locking pin 70' and at an opposite end to a lever 92 incorporated within the handle 18'. The cable 90 may be constructed from wire, nylon or another suitable material, and may be coupled to the pin 70' and lever 92 by appropriate fastening means, while the lever 92 may be constructed from hard plastic and the like, similar to the handle 18'. The lever 92 comprises a generally T-shaped member mounted to the underside of the handle 18' by a pivot pin 94 for pivotal movement of the lever 92 in a first and second direction. The lever 92 passes from the underside of the handle 18' through spaces 96 provided in the handle tube 12' and handle 18' and has an exposed knob 98 on the topside of the handle 18' for grasping and moving in the first and second directions by the operator.

As best shown in FIG. 5, movement of the lever 92 in the first direction away from the housing 14', shown by the dotted lines in FIG. 5, places tension on the cable 90 and pulls the pin 70' out of engagement with the teeth 74'. In this position, the spring 64' is compressed between the flanged ring 68' and the collar 42'. Movement of the lever 92 in the second or opposite direction releases tension from the cable 90 and permits spring-loaded return of the locking pin 70' into engagement with the teeth 74'.

A significant feature of both embodiments is the pivotal connection of the handle tube 12 and collar 42 to the housing 14. As noted in FIGS. 3 and 6, the collar 42 is mounted to the upwardly facing outer surface 46 of the housing 14, thereby potentially enabling the possible entry of grass trimmings and other matter into the housing 14. However, the circular disk-shaped configuration of the collar 42 enables rotation of the collar 42 without obstruction with the housing 14 and provides a substantially sealed connection therebetween to impede the entry of cut grass, dirt and other matter within the housing 14.

From the foregoing, it will be appreciated that the pivotally adjustable handle tube trimmer 10 of this invention provides quick and easy angular movement of the handle tube 12 with respect to the motor housing 14 to accommodate a variety of trimming problems. In the first embodiment, the handle tube 12 is axially pulled out of the housing 14 disengaging the pin 70 from the teeth 74, rotated to the desired position, and then released to allow the spring 64 to return the pin 70 into normal engagement with the teeth 74. In the second embodiment, a lever and cable assembly 89 is operated at the handle 18' to slidably move the pin assembly 66' in and out of engagement with the teeth 74'. In either case, angular adjustment of the handle tube is accomplished quickly and easily without requiring any trimmer disassembly, use of tools, or the like.

While a particular form of the invention has been illustrated and described, it will be apparent that various modifications can be made without departing from the spirit and scope of the invention. Accordingly, it is not intended that the invention be limited, except as by the appended claims.

I claim:

1. A trimmer, comprising:
   a housing;
   a motor mounted within said housing;
   a handle tube having one end mounted to said housing for pivoted movement with respect to said housing;
   a collar mounted for rotation on said housing, said collar having a bore for axially slidably receiving said handle tube, said handle tube being pivotally movable with respect to said housing upon rotation of said collar with respect to said housing;
   means for limiting axial sliding movement of said handle tube within said collar; and
   means on said housing for releasably locking said handle tube against pivoted movement with respect to said housing at a selected one of a plurality of positions of adjustment; said limiting means including a bolt for rotatably mounting said collar and said handle tube to said housing, said bolt being inserted through a pair of oppositely facing holes formed transversely in said collar and a pair of oppositely facing axially elongated slots in said handle tube, thereby to permit rotation of said collar and said handle tube with respect to said housing, as well as limited axial movement of said handle tube with respect to said bolt and collar.

2. The trimmer of claim 1, wherein said collar comprises a pair of separate collar halves joined together by a transverse retainer screw, said retainer screw being inserted through a second pair of oppositely facing axially elongated slots in said handle tube.

3. The trimmer of claim 2, wherein said bolt comprises a pair of hollow stubshafts, with each of said collar halves being integrally formed with a respective one of said stubshafts, said stubshafts projecting outwardly from said collar halves for mounting said collar to said housing and projecting inwardly into said collar halves for substantially mating engagement with each other to form said bolt.

4. The trimmer of claim 1, wherein said collar and said bolt are separately formed pieces.

5. The trimmer of claim 3, wherein a harness for connecting electrical power to said motor is inserted through an entrance hole and an exit hole in said bolt, said entrance hole being positioned in one of said stubshafts, and said exit hole comprising two matching semicircular cut-outs formed on oppositely facing inboard mating ends of said stubshafts.

6. The trimmer of claim 1, wherein said collar and said handle tube are rotatably mounted in an opening formed in an outside upwardly facing surface of said housing, with said collar substantially sealing the opening for preventing the entry of grass, weeds and the like into said housing.

7. The trimmer of claim 6, wherein opposite ends of said pin extend radially outwardly a short distance from said handle tube, and said pair of racks are spaced apart on opposite lateral sides of said handle tube, with said teeth on each of said racks being transversely aligned with respect to each other for simultaneous engagement with said opposite ends of said pin.

8. The trimmer of claim 1 wherein said trimming means comprises a nylon cord rotated by said motor.

9. A trimmer, comprising:
   a housing;
   a motor mounted within said housing;
   a handle tube having one end mounted to said housing for pivoted movement with respect to said housing;
   a collar mounted for rotation on said housing, said collar having a bore for axially slidably receiving said handle tube, said handle tube being pivotally movable with respect to said housing upon rotation of said collar with respect to said housing;
   means for limiting axial sliding movement of said handle tube within said collar; and
   means on said housing for releasably locking said handle tube against pivoted movement with respect to said housing at a selected one of a plurality of positions of adjustment;
   said releasable locking means includes a locking pin connected to said handle tube, a plurality of teeth within said housing for engagement by said pin at selected pivotal positions of said handle tube relative to said housing, means for normally urging said handle tube for axial sliding movement within said collar to urge said pin into engagement with said teeth, said handle tube being arranged so as to be movable axially within said collar a limited axial distance against said urging means to retract said pin from said teeth and to permit pivoting of said handle tube with respect to said housing to a desired alternate position of adjustment and said urging means being arranged so as to slidably return said handle tube within said collar thereby positioning said pin for engagement with said teeth upon release of said handle tube.

10. A trimmer, comprising:
    a housing;
    a motor mounted within said housing;
    trimming means operated by said motor;
    a handle tube having one end mounted to said housing for pivotal movement with respect to said housing; and
    means on said housing for releasably locking said handle tube against pivotal movement with respect to said housing at a selected one of a plurality of positions of adjustment;
    said releasably locking means includes a pin axially slidably receivable through oppositely facing axially elongated slits in said handle tube, said pin having opposite ends extending radially outwardly a short distance from said handle tube, a plurality of teeth within said housing for engaging said opposite ends of said pin at selected pivotal positions of said handle tube to lock said handle tube against pivoting movement relative to said housing, a lever pivotally mounted to an opposite end of said handle tube external of said housing for movement in first and second directions, a cable connected between said pin and said lever for moving said opposite ends of said pin out of engagement with said teeth upon movement of said lever in said first direction, and means for normally urging said opposite ends of said pin into engagement with said teeth upon movement of said lever in said second direction.

11. The trimmer of claim 10, further comprising a collar mounted for rotation on said housing, said collar having a bore for axially receiving said handle tube, said handle tube being pivotally movable with respect to said housing upon rotation of said collar with respect to said housing.

12. The trimmer of claim 11, wherein said urging means comprises a spring positioned coaxially over said handle tube and compressible between said collar and said pin for normally urging said pin into engagement with said teeth, whereby movement of said lever in said first direction away from said housing places tension on said cable, compresses said spring and retracts said pin out of engagement with said teeth, thereby permitting pivotal movement of said handle tube with respect to said housing, and releasing of said lever allows said lever to move in said second direction towards said housing and releases tension from said cable and allows said spring to normally urge said pin into engagement with said teeth.

13. The trimmer of claim 9, wherein said teeth are formed on a pair of racks mounted within said housing on opposite lateral sides of said handle tube, and each having a curvature that substantially corresponds to the arcuate movement of said pin as said handle tube is pivoted with respect to said housing.

14. The trimmer of claim 9, wherein said urging means comprises a spring compressable between said pin and said collar.

15. The trimmer of claim 10, wherein said trimming means comprises a nylon cord rotated by said motor.

16. A trimmer, comprising:
a housing;
a motor mounted within said housing and connected to a source of electrical power;
trimming means operated by said motor;
a collar mounted in an opening formed in an outside upwardly facing surface of said housing for rotation with respect to said housing;
a handle tube having one end slidably receivable through a bore in said collar, with a portion of said handle tube extending within said housing, said handle tube being pivotally movable with respect to said housing upon rotation of said collar with respect to said housing;
means for limiting axial sliding movement of said handle tube within said collar;
means on said housing releasably locking said handle tube against pivotal movement with respect to said housing at a selected one of a plurality of positions of adjustment; and
means for normally urging said handle tube for axial sliding movement within said collar for engagement with said releasably locking means.

17. The trimmer of claim 16, wherein said collar comprises a substantially circular disk-shaped body having a short cylindrical extension protruding radially outwardly therefrom, with the bore of said collar passing diametrically through said circular disk-shaped body and axially through said short cylindrical extension, said collar being mounted for rotation on said housing by a mounting bolt passing through oppositely facing holes formed transversely in the center of said circular disk-shaped body and perpendicular to said bore, with opposite ends of said bolt being connected to said housing.

18. The trimmer of claim 17, wherein said limiting means comprises a pair of oppositely facing axially elongated slots in said handle tube for receiving said bolt and permiting rotation of handle tube with respect to said bolt, as well as limited axial movement of said handle tube with respect to said bolt and said collar.

19. The trimmer of claim 16, wherein said releasably locking means comprises a ring coaxially placed over said one end of said portion of said handle tube extending within said housing, a locking pin for rigidly connecting said ring to said handle tube, said pin having opposite ends extending radially outwardly a short distance from said ring, and a plurality of teeth within said housing for engagement by said opposite ends of said pin at selected pivotal positions of said handle tube relative to said housing.

20. The trimmer of claim 19, wherein said teeth are formed on a pair of racks mounted within said housing on opposite lateral sides of said ring and each having a curvature substantially corresponding to the arcuate movement of said pin as said handle tube is pivoted with respect to said housing, with said teeth on each of said racks being aligned with respect to each other for simultaneous engagement with said opposite ends of said pin.

21. The trimmer of claim 19, wherein said urging means comprises a spring positioned coaxially over said handle tube and compressible between said collar and said ring for normally urging said pin into engagement with said teeth, said handle tube being movable axially within said collar a limited axial distance against said spring to retract said pin from said teeth and to permit pivoting of said handle tube with respect to said housing to a desired alternate position of adjustment, said spring slidably returning said handle tube within said collar to a position with said opposite ends of said pin engaging said teeth upon release of said handle tube.

22. The trimmer of claim 21, wherein an inboard end of said ring has a radially outwardly protruding flange for engagement with said spring.

23. The trimmer of claim 20, wherein said teeth on said racks are spaced apart approximately every ten degrees of curvature of said rack.

24. A trimmer, comprising:
a housing;
a motor within said housing;
trimming means arranged to be operated by said motor;
a collar mounted in an opening formed in an outside upwardly facing surface of said housing for rotation with respect to said housing;
a handle tube having one end slidably receivable through a bore in said collar and a portion of said handle tube extending within said housing, said handle tube being pivotally movable with respect to said housing upon rotation of said collar with respect to said housing; and
means on said housing for releasably locking said handle tube against pivotal movement with respect to said housing at a selected one of a plurality of positions of adjustment;
said releasable locking means including a ring slidably receivable over said one end of said portion of said handle tube extending within said housing, a locking pin rigidly connected to said ring and axially slidably receivable through oppositely facing axially elongated slits in said handle tube, said pin having opposite ends extending radially outwardly a short distance from said ring, a plurality of teeth within said housing for engagement by said opposite ends of said pin at selected pivotal positions of said handle tube to lock said handle tube against pivoting movement relative to said housing, a lever pivotally mounted to an opposite end of said handle tube external of said housing for movement in first and second directions, a cable connected between said pin and said lever for moving said opposite ends of said pin out of engagement with said teeth upon movement of said lever in said first direction, and means for normally urging said opposite ends of said pin into engagement with said teeth upon movement of said lever in said second direction.

25. The trimmer of claim 24, wherein said teeth are formed on a pair of racks mounted within said housing on opposite lateral sides of said ring and each having a curvature substantially corresponding to the arcuate movement of said pin as said handle tube is pivoted with respect to said housing, with said teeth on each of said racks being aligned with respect to each other for simultaneous engagement with said opposite ends of said pin.

26. The trimmer of claim 24, wherein said urging means comprises a spring positioned coaxially over said handle tube and compressible between said collar and said ring for normally urging said pin into engagement with said teeth, whereby movement of said lever in said first direction away from said housing places tension on said cable, compresses said spring and retracts said pin out of engagement with said teeth, thereby permitting pivotal movement of said handle tube with respect to said housing, and releasing of said lever allows said lever to move in said second direction towards said housing and releases tension from said cable and allows said spring to normally urge said pin into engagement with said teeth.

27. The trimmer of claim 26, wherein an inboard end of said ring has a radially outwardly protruding flange for engagement with said spring.

28. The trimmer of claim 25, wherein said teeth on said racks are spaced apart approximately every ten degrees of curvature of said rack.

* * * * *